US008488496B2

(12) United States Patent
Kubo et al.

(10) Patent No.: US 8,488,496 B2
(45) Date of Patent: Jul. 16, 2013

(54) WIRELESS LOCAL AREA NETWORK (LAN) SYSTEM

(75) Inventors: Hiroaki Kubo, Shiga-ken (JP); Masakuni Okada, Kanagawa (JP); Takehito Sakuragi, Kanagawa (JP); Kazuto Yamafuji, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/599,104

(22) PCT Filed: Apr. 17, 2008

(86) PCT No.: PCT/JP2008/057532
§ 371 (c)(1),
(2), (4) Date: Nov. 25, 2009

(87) PCT Pub. No.: WO2008/139830
PCT Pub. Date: Nov. 20, 2008

(65) Prior Publication Data
US 2010/0214999 A1    Aug. 26, 2010

(30) Foreign Application Priority Data
May 8, 2007  (JP) ................................. 2007-123906

(51) Int. Cl.
*H04L 12/16*    (2006.01)
*H04J 3/06*     (2006.01)
(52) U.S. Cl.
USPC .......................................... 370/270; 370/350
(58) Field of Classification Search
USPC ....................................................... 370/270
See application file for complete search history.

(56) References Cited

U.S. PATENT DOCUMENTS

| 7,460,503 | B2 * | 12/2008 | Young ............................ 370/331 |
| 7,570,969 | B2 * | 8/2009 | Hwang et al. .................. 455/522 |
| 7,957,342 | B2 * | 6/2011 | Ohmi et al. .................... 370/328 |
| 2002/0044549 | A1 * | 4/2002 | Johansson et al. ............ 370/386 |
| 2002/0115458 | A1 * | 8/2002 | Mizuno et al. ................ 455/507 |
| 2003/0179722 | A1 * | 9/2003 | Takatori et al. ............... 370/315 |
| 2004/0233858 | A1 * | 11/2004 | Karaoguz ..................... 370/254 |
| 2005/0276255 | A1 * | 12/2005 | Aiello et al. .................. 370/348 |
| 2007/0060140 | A1 * | 3/2007 | Kanda ........................... 455/445 |
| 2007/0184779 | A1 * | 8/2007 | Park et al. .................... 455/41.2 |
| 2008/0232393 | A1 * | 9/2008 | Dharmaraju et al. ......... 370/453 |

FOREIGN PATENT DOCUMENTS

| JP | 2003-143644 A | 5/2003 |
| JP | 2004274016 A | 9/2004 |
| JP | 2005-176356 A | 6/2005 |
| JP | 2006-287477 A | 10/2006 |
| WO | 2005/034434 A1 | 4/2005 |

* cited by examiner

*Primary Examiner* — Brandon Renner
*Assistant Examiner* — Shaq Taha
(74) *Attorney, Agent, or Firm* — Roy W. Truelson (57) ABSTRACT

A situation is circumvented where wireless communication becomes impossible in a wireless LAN system under the influence of a blocking object, noise caused by an electromagnetic wave, or the like. A wireless LAN system comprises: a relay which can communicate with an external system; a master which can communicate with the relay; and a plurality of slaves which can wirelessly communicate with the master, the plurality of slaves including a first group and a second group, the first group comprising an alternative slave having a function of transmitting, when a portion of the slaves cannot receive a synchronization signal from the master, an information signal received from the master to the portion of slaves, and the second group comprising non-alternative slaves and not having the function of transmitting the information signal to the portion of slaves.

6 Claims, 11 Drawing Sheets

(a) SWITCHING TABLE

| IP_Addr | DEV_ID |
|---|---|
| IP#1 | DEV#1 |
| IP#2 | DEV#2 |
| ⋮ | ⋮ |

(b) CONNECTION TABLE

| CONNECTED DEV_ID | TYPE | ATTRIBUTE |
|---|---|---|
| #1 | A | static,(#2) |
| #2 | A | static,(#1) |
| ⋮ | ⋮ | ⋮ |

FIG. 7

(a) SWITCHING TABLE

| IP_Addr | DEV_ID |
|---|---|
| IP#1 | DEV#1 |
| IP#2 | DEV#2 |
| IP#5 | DEV#5 |
| ⋮ | ⋮ |

(b) CONNECTION TABLE

| CONNECTED DEV_ID | TYPE | ATTRIBUTE |
|---|---|---|
| #1 | A | static |
| #2 | A | static |
| #5 | B | static,(#1,#2) |
| ⋮ | ⋮ | ⋮ |

(a) SWITCHING TABLE

| IP_Addr | DEV_ID |
|---------|--------|
| IP#1 | DEV#1 |
| IP#2 | DEV#2 |
| IP#5 | DEV#5 |
| IP#4 | DEV#4 |
| ... | ... |

FIG. 8

(b) CONNECTION TABLE

| CONNECTED DEV_ID | TYPE | ATTRIBUTE |
|---|---|---|
| #1 | A | static |
| #2 | A | static |
| #5 | B | static,(#1,#2) |
| #4 | B | sd hoc |
| ... | ... | ... |

WIRELESS LOCAL AREA NETWORK (LAN) SYSTEM

FIELD OF THE INVENTION

The present invention generally relates to a wireless local area network (LAN) system. More specifically, the present invention relates to a LAN system in a relatively small space such as a home or office.

BACKGROUND ART

In recent years, IEEE 802.11a/g/b-based wireless LANs have become common for home use. Higher speed wireless standards are also under development. In the industry, there are trends to place wireless LANs as home network infrastructure by the distribution of AV streams using a high-speed wireless LAN, a home security sensor (glass breakage detection) using the easiness of wireless installation, and the like.

Meanwhile, due to characteristics of radio waves, wireless LANs are susceptible to blocking objects, noise caused by electromagnetic waves, and the like. Particularly, millimeter waves, UWB, etc., for high-speed wireless LANs are susceptible to obstacles and the like. In order to spread high-speed wireless LANs as home network infrastructure, there is a need to take measures against such interference.

However, wireless LANs are premised on an ad-hoc connection (which is not continuous communication but a dynamic network connection). Thus, wireless disconnection is not recognized as an abnormal condition. The IEEE 802.15.3 standard and the like do not even consider a mechanism for treating wireless disconnection as an abnormal condition. Also, there is no mechanism for notifying communication disconnection in a wireless network layer. Particularly, in the case of a network where a wired portion is tunneled (an IP packet or Ethernet frame is encapsulated), a device on the Ethernet side considers wireless disconnection as an unexplained communication failure.

The development of the high-speed wireless LAN is still at an experimental stage towards the practical use. In current measures, circumventing measures from the viewpoint of devising strategies for prevention of radio interference, such as "sending radio waves from a location with a clear view using a waveguide" or "appropriately adjusting an output" is mainstream.

As a conventional technique, Japanese Unexamined Patent Publication (Kokai) No. 2004-282758 discloses a method in which, in a wireless network which is controlled by a single controller, when the controller breaks down (or stops) the controller is switched to an alternative controller and network control is performed using the alternative controller, whereby the wireless network is maintained. However, this method is not to circumvent a situation where wireless communication becomes difficult under the influence of a blocking object, noise caused by an electromagnetic wave, or the like.

SUMMARY OF THE PRESENT INVENTION

It is an object of the present invention to automatically maintain a communication service when radio interference occurs in a wireless LAN system.

It is another object of the present invention to circumvent a situation where wireless communication becomes impossible in a wireless LAN system under the influence of a blocking object, noise caused by an electromagnetic wave, or the like. Note that the expression "wireless communication becomes impossible" as used herein involves not only the case where communication cannot be performed at all but also the case in which communication cannot be performed stably (e.g., the case in which communication frequently or intermittently is lost).

According to one embodiment of the present invention, there is provided a wireless LAN system comprising: a relay which can communicate with an external system; a master which can communicate with the relay; and a plurality of slaves which can wirelessly communicate with the master, the plurality of slaves including a first group and a second group, the first group comprising an alternative slave having a function of transmitting, when a portion of the slaves cannot receive a synchronization signal from the master, an information signal received from the master to the portion of slaves, and the second group including non-alternative slaves not having the function of transmitting the information signal to the portion of slaves.

According to another embodiment of the present invention, there is provided a wireless communication method between a master and a plurality of slaves which are included in a wireless LAN system, comprising the steps of: transmitting a first synchronization signal to the plurality of slaves from the master; transmitting a first received signal to the master from a slave having received the first synchronization signal; sending a second synchronization signal from a specific slave among the plurality of slaves to other slaves; transmitting a second received signal to the specific slave from slaves having received the second synchronization signals; transmitting an information signal to the specific slave from the master; and transmitting the information signal from the specific slave to a slave not having sent a first received signal among the slaves having received the second synchronization signals.

According to an embodiment of the present invention, even when communication becomes impossible between a master and a portion of slaves in a wireless LAN system due to wireless communication failure caused by an obstacle, noise, or the like, an alternative communication route between the master and the portion of slaves can be automatically secured.

According to an embodiment of the present invention, when communication becomes impossible between a master and a portion of slaves in a wireless LAN system due to wireless communication failure caused by an obstacle, noise, or the like, a specific slave among slaves automatically substitutes for (relays) the master, whereby the communication between the master and the portion of slaves can be maintained.

According to an embodiment of the present invention, when wireless communication failure caused by an obstacle, noise, or the like in a wireless LAN system is removed, the communication route can automatically revert to the one used before occurrence of the failure.

According to and embodiment of the present invention, regardless of occurrence of wireless communication failure caused by an obstacle, noise, or the like in a wireless LAN system, a communication (service) between a master and slaves can be maintained.

DETAILED DESCRIPTION OF THE PRESENT INVENTION

The present invention will be described below with reference to the drawings. The following description is premised on the use of PICONET based on the IEEE 802.15.3 standard. However, the present invention is not limited to this premise and other standards, methods, or the like, can of course be used.

In one embodiment of the present invention, a system for transmitting and receiving LAN packets in an IEEE 802.15.3 PICONET is assumed. PICONET refers to a wireless communication subnet defined by IEEE 802.15.3. In the present embodiment, the following contents (A and B) are disclosed. Note that a ChildPICONET which appears below refers to the minimum unit of a network defined by IEEE 802.15.3.

A. System for dynamically securing another route using a ChildPICONET, when a failure (wireless disconnection) occurs (a-1) System configuration for securing another route during failure (wireless disconnection)

Figure 1:
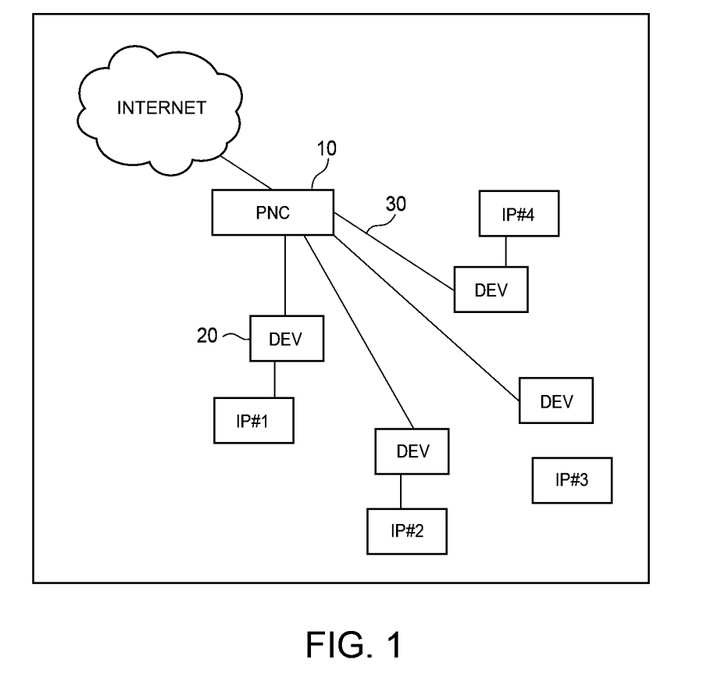
FIG. 1 is a diagram showing a basic configuration of a LAN packet communication system using a normal PICONET, according to the present invention.

(a-2) Method for detecting occurrence of failure (wireless disconnection), by each device in the system (a-3) Method for selecting another route (a-4) Method for detecting recovery from failure and reverting to the original route B. Method for recognizing, in a wireless layer, occurrence of failure in a wireless portion between specific devices and alerting notified failure FIG. 1 shows a basic configuration of a LAN packet communication system using a PICONET, according to the present invention. In this configuration, a PNC (PICONET coordinator) 10 for controlling a PICONET is wirelessly connected to a plurality of DEVs (DEVices) 20 and a LAN packet is tunneled (or protocol-converted). The PNC 10 is connected to an external system via a relay (not shown). In optical communication (FTTH), a relay includes a converter for converting light into an electrical signal (millimeter wave or the like). A line 30 between the PNC 10 and each DEV 20 means the presence of a wireless communication route. The meaning of the lines 30 is also the same in other drawings. IP#1 to IP#4 represent LAN devices (PCs, various household electrical appliances, or the like) assigned to the respective DEVs. At the same time, IP#n also represents an Ethernet MAC address or an IP address of an IP packet, which corresponds to each device. The meaning of IP#n is also the same in other drawings.

IEEE 802.15.3 defines that devices in a PICONET can mutually communicate. In communication that provides an Internet connection to a home, communication between DEVs also uses a route of DEV→PNC→DEV for the following reasons:

(a) a PNC is only one gateway to the Internet; and (b) the DEVs are not always installed in communicable areas.

Although the connection to the PICONET is ad hoc, a route of a LAN packet is configured by a combination of DEVs and the PNC. In order to expand a wireless coverage, IEEE 802.15.3 also defines that a child PICONET can be used.

A. System for Dynamically Securing Another Route When a Failure (Wireless Disconnection) Occurs (a-1) System Configuration for Securing Another Route During Failure (Wireless Disconnection)

Figure 2:
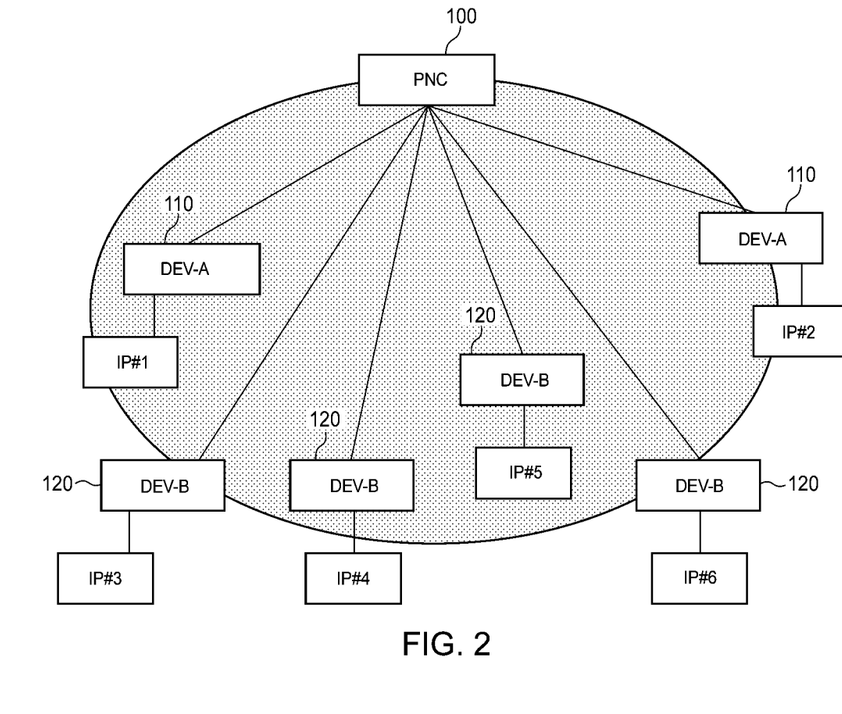
FIG. 2 is a diagram showing a system configuration in the present invention.

FIG. 2 shows a system configuration in the present invention for securing another route during failure (wireless disconnection). There is one PNC 100. DEVs are of two types: DEV-A and DEV-B. DEV-As 110 have the function of becoming a PNC of a child PICONET. DEVs-B 120 do not have the function of becoming a PNC.

Figure 3:
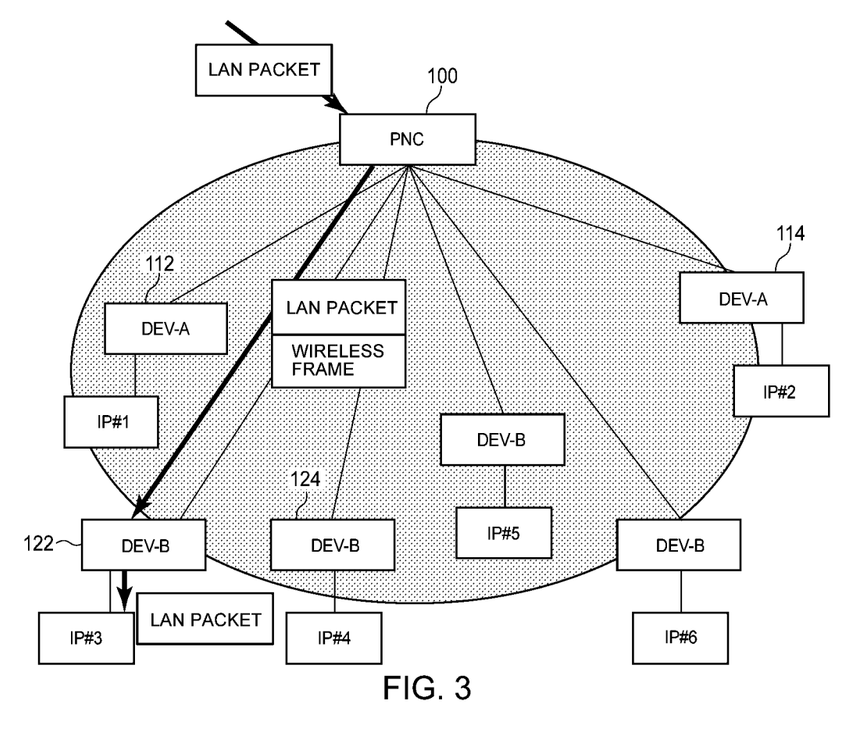
FIG. 3 is a diagram showing a system configuration (before occurrence of failure) in the present invention.
Figure 4:
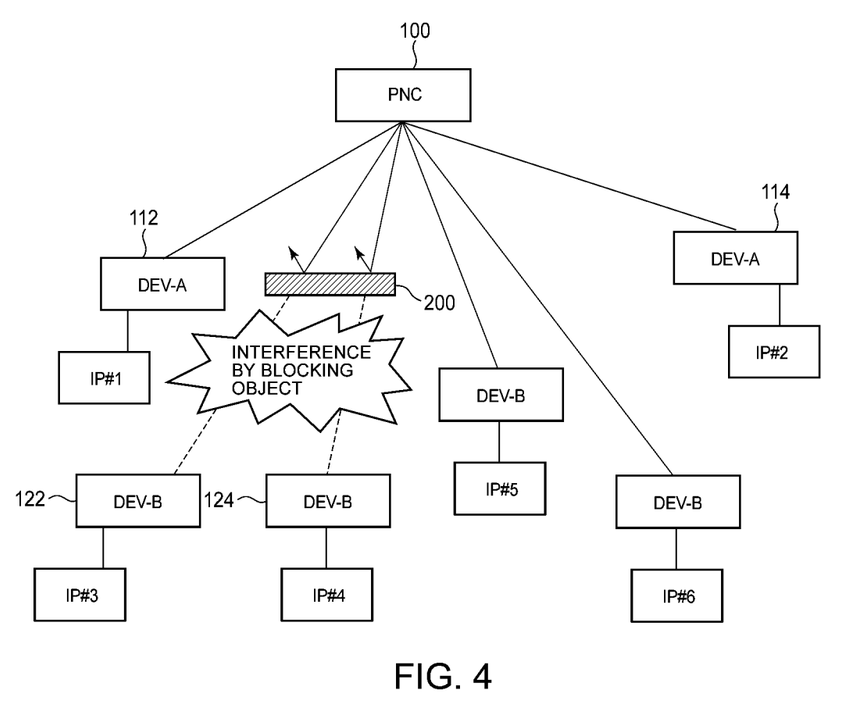
FIG. 4 is a diagram showing a system configuration (immediately after occurrence of failure) in the present invention.
Figure 5:
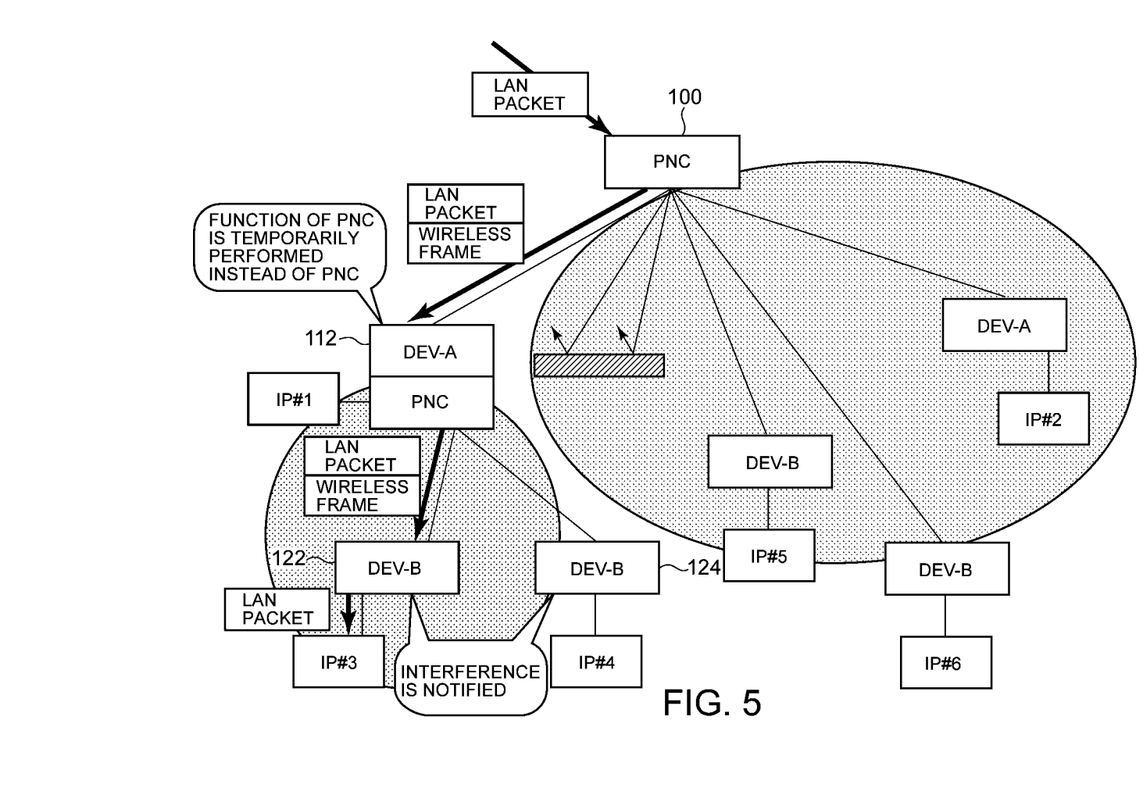
FIG. 5 is a diagram showing a system configuration (a state showing securing of an alternative route after occurrence of failure) in the present invention.

Referring to FIGS. 3 to 5, a process flow performed during failure (wireless disconnection) is shown below.

(1) In FIG. 3, in one PICONET which is normally managed by a PNC 100, the PNC 100, DEVs-A, and DEVs-B perform wireless communication. Specifically, LAN packet communication is performed with LAN devices (IP#n). In FIG. 3, for example, the PNC 100 communicates with IP#3 of a DEV-B 122.

(2) In FIG. 4, when an obstacle 200 or the like is placed, some DEVs-B become unable to communicate with the PNC 100. In FIG. 4, two DEVs-B, i.e., a DEV-B 122 (IP#3) and a DEV-B 124 (IP#4), cannot communicate with the PNC 100.

(3) In FIG. 5, a DEV-A 112 which has detected a failure (wireless disconnection) operates as an alternative PNC and creates a child PICONET. In FIG. 5, the DEV-B122 (IP#3) and the DEV-B124 (IP#4) which have become unable to communicate with the PNC 100 switch their connections to the DEV-A 112 (PNC). LAN packets are transmitted through an alternative route of PNC 100-DEV-A 112-DEV-B 122/124.

(4) When the failure is removed, the route reverts to the original one shown in FIG. 3.

The operation of the system in the present invention exemplified in FIGS. 2 to 5 has the following two features.

(1) In a conventional method for selecting an alternative route for a network failure, complex routing information exchange based on a routing protocol is performed. In the present invention, however, only by multicasting by a device a packet for notifying other devices of its presence, switching to an alternative route is performed. The method of the present invention is different from a conventional one in which the load of routing information exchange is heavy and a route request is made during failure, and thus, fast switching to an alternative route is performed.

(2) In the present invention, handling devices that require a static connection in distinction from devices (ad hoc) that do not require a static connection can prevent an increase in system load caused by activation of an unnecessary alternative route.

Figure 6:
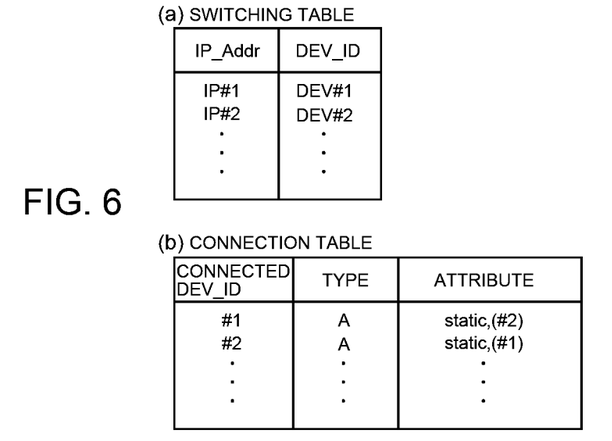
FIG. 6 is a diagram showing a switching table and a connection table which are included in a PNC.

(a-2) Method for Detecting Occurrence of Failure (Wireless Disconnection), by Each Device in the System The PNC periodically sends a beacon (synchronization signal) to inform each DEV of its presence. Sending of a beacon is performed based on IEEE 802.15.3. DEVs-A periodically transmit a "static connection info" packet. The PNC has (a) switching table and (b) connection table shown in FIG. 6, in order to manage a connection relationship with each DEV. In (b) connection table in FIG. 6, #1 and #2 are entered as DEVs (DEVs-A) of type A. The term "static" in (b) connection table refers to a static connection. (#2) and (#1) shown next to the terms "static" respectively indicate that the DEV-A (#1) can see (communicate with) the DEV-A (#2) and vice versa. If the PNC does not receive a "static connection info" packet for a certain period of time, the PNC determines that the DEVs-A cannot be seen.

Figure 7:
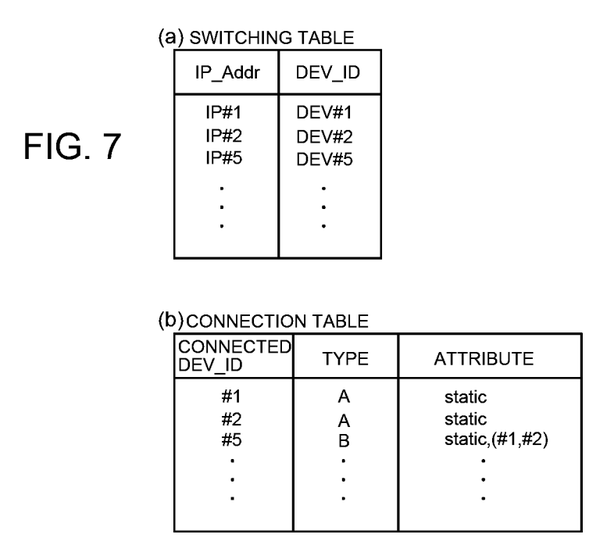
FIG. 7 is a diagram showing a table for the case in which a DEV-B (#5) in FIG. 2 is registered as IP#5.

Among DEVs of type B, a DEV-B that requires a static connection periodically multicasts a "static connection info" packet. The "static connection info" packet is the same as the one used to verify the presence of a DEV-A. FIG. 7 shows a table for the case in which a DEV-B (#5) in FIG. 2 is registered as IP#5. (b) connection table in FIG. 7 shows that the DEV-B with #5 is static and can be connected to the DEVs-A with #1 and #2.

Figure 8:
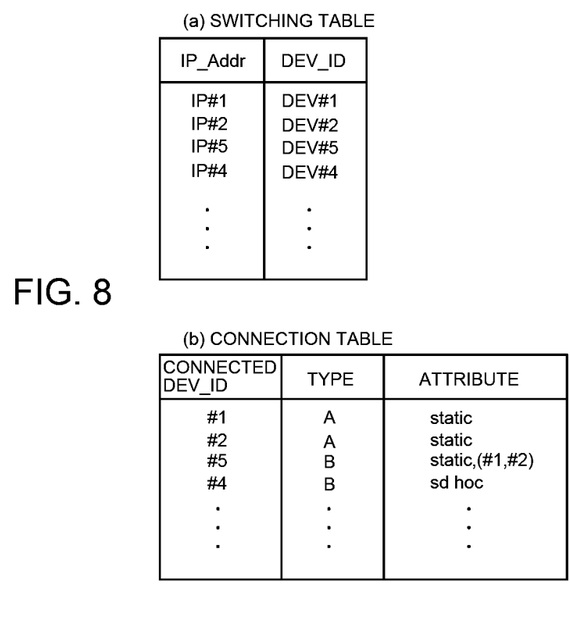
FIG. 8 is a diagram showing a table for the case in which a DEV-B (#4) in FIG. 2 is registered as IP#4.

A DEV-B that does not require a static connection, i.e., a DEV-B using an ad-hoc connection, does not multicast a "static connection info" packet. This DEV-B operates as defined in IEEE 802.15.3. FIG. 8 shows a table for the case in which a DEV-B (#4) in FIG. 2 is registered as IP#4. In (b) connection table in FIG. 8, information that the DEV-B with #4 is ad hoc is entered. As such, by using a connection table, even when both static and ad-hoc devices are present, the devices can be appropriately managed.

(a-3) Method for Selecting Another Route

A selection of another route is performed in the manner shown below using switching tables managed by PMC/DEV-A.

Figure 9:
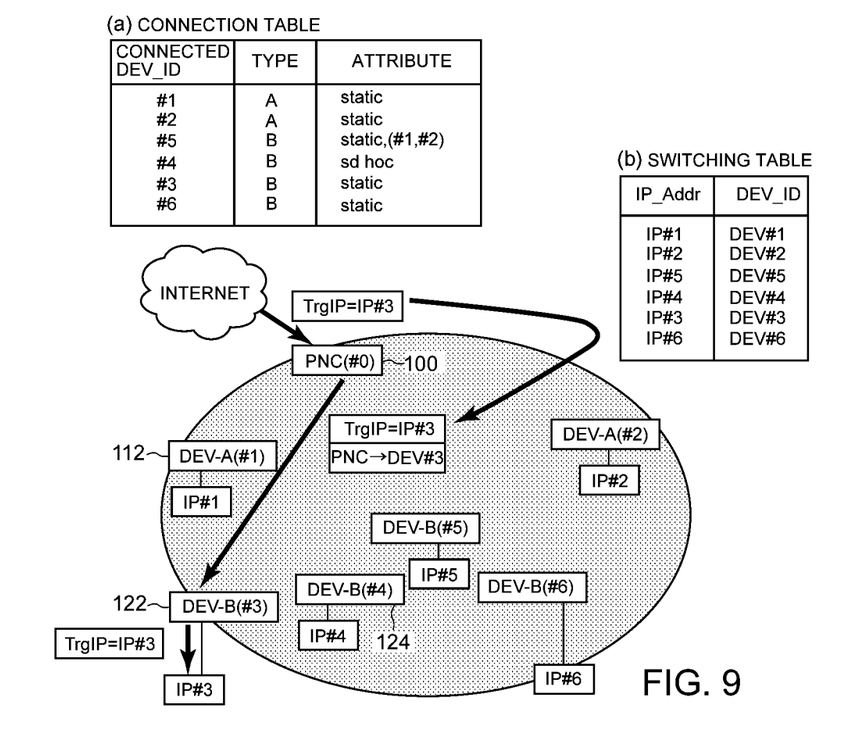
FIG. 9 is a diagram showing a state in which, after #4 in FIG. 8 is recognized, DEVs-B with #3 and #6 are further connected.

(1) In FIG. 9, in a normal state, based on (b) switching table of the PNC 100, a LAN packet is encapsulated by a protocol of a wireless portion to perform tunneling. FIG. 9 shows a state in which, after #4 in FIG. 8 is recognized, DEVs-B with #3 and #6 are further connected.

Figure 10:
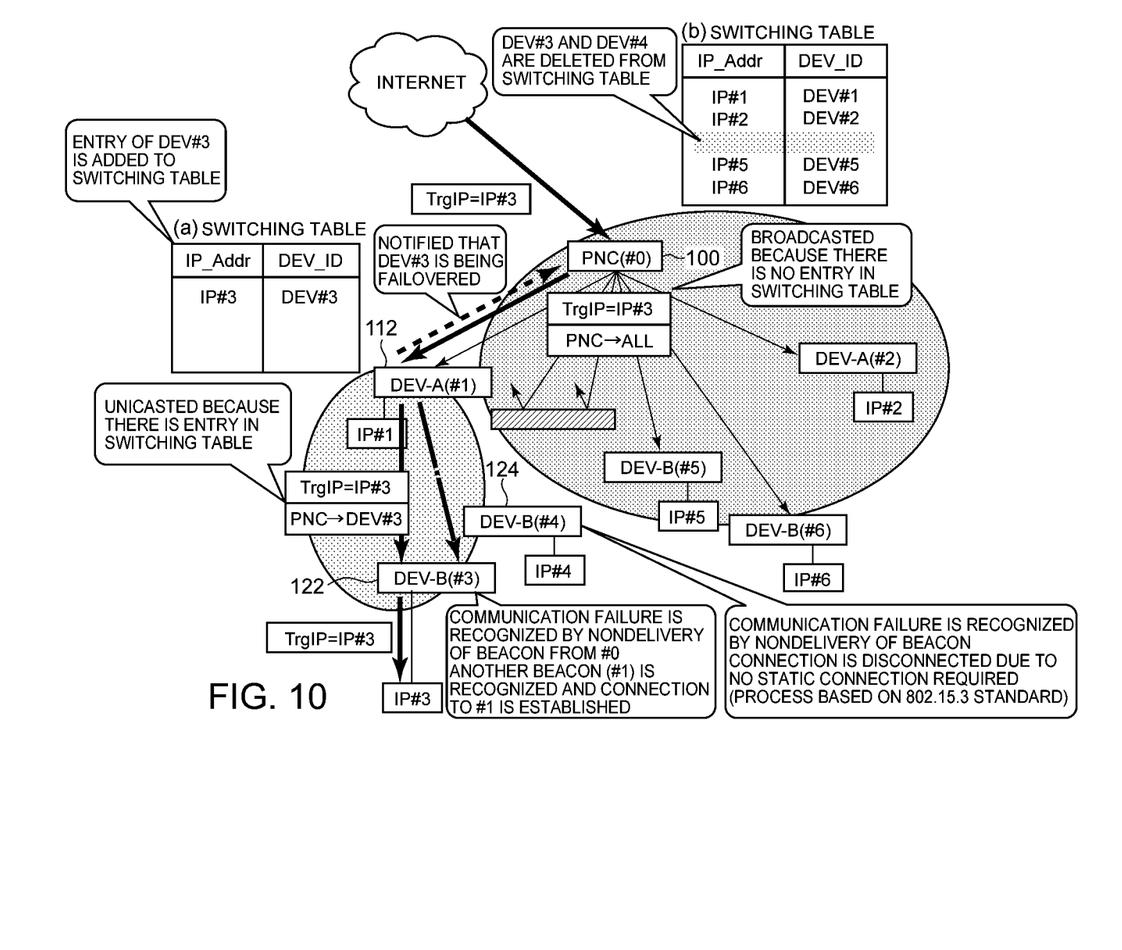
FIG. 10 is a diagram showing a state in which connections between the DEVs-B (#3 and #4) and the PNC are disconnected.
Figure 11:
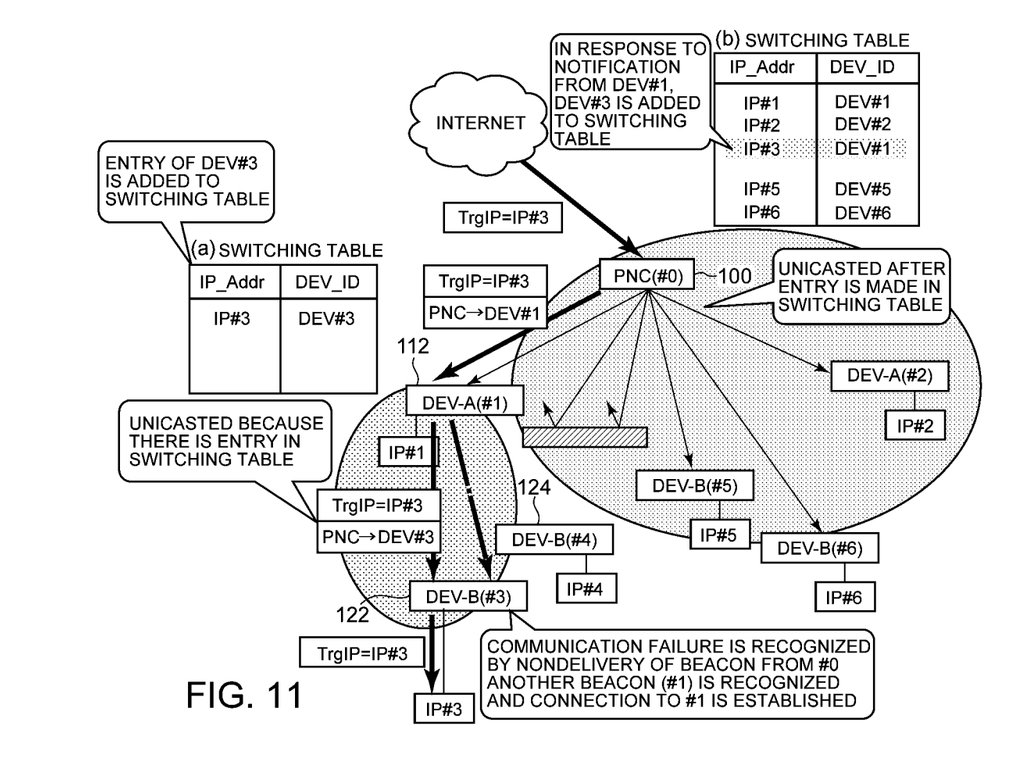
FIG. 11 is a diagram showing a state in which a connection between the DEV-B (#3) and the PNC is secured by an alternative route via a DEV-A (#1)

(2) In FIGS. 10 and 11, it is assumed that connections between the DEVs-B (#3 and #4) and the PNC 100 are disconnected, for example.

2-1) The DEV-B 124 with #4 that does not require a static connection closes its connection as defined in IEEE 802.15.3.

2-2) The DEV-B 122 with #3 that requires a static connection is connected to the DEV-A 112 which is an alternative PICONET (child PICONET managed by #1).

2-3) The DEV-A (#1) 112 registers IP#3 in (a) switching table included in #1.

2-4) The DEV-A (#1) 112 notifies the PNC (#0) 100 that #3 is connected to the DEV-A (#1) 112 as an alternative path (a process of this notification by #0 is asynchronous).

2-5) The PNC 100 having detected the disconnection from #3 and #4 deletes information on #3 and #4 from (b) switching table (FIG. 10).

2-6) When a LAN packet destined for #3 arrives, the PNC 100 broadcasts the LAN packet throughout the PICONET.

2-7) The DEV-A (#1) receives the LAN packet and transmits the LAN packet to #3 registered in the switching table of #1.

2-8) The DEV-B (#3) send/receives the LAN packet through an alternative route of #0<→#1<→#3.

(3) When a process by #1 in the above 2-4) ends, information indicating that data to #3 is transmitted via #1 (DEV#1) is registered in (b) switching table (FIG. 11) of the PNC (#0) 100. After this, when a LAN packet destined for #3 arrives, the PNC 100 unicasts the LAN packet to the DEV-A (#1).

Figure 12:
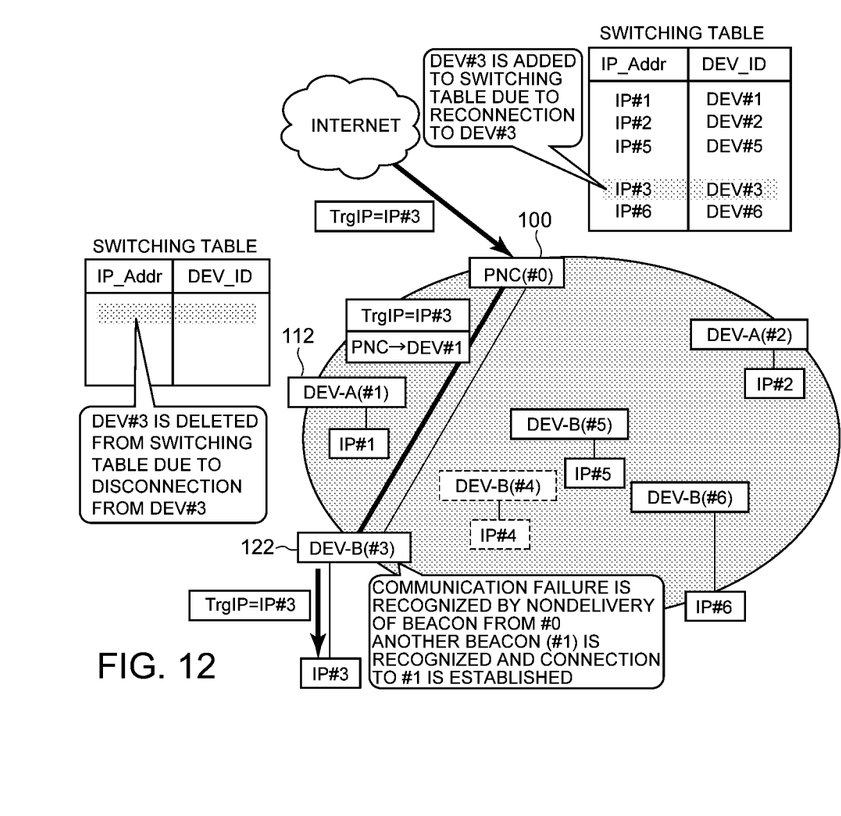
FIG. 12 is a diagram showing a state in which the interference is removed and the original connection between the DEV-B (#3) and the PNC is recovered.

(a-4) Method for Detecting Recovery from Failure and Reverting to the Original Route In FIG. 12, the DEV-B (#3) 122 using the alternative route monitors resumption of a beacon from the PNC 100. When a beacon is resumed by removal of the obstacle, for example, the connection of the DEV-B (#3) 122 to the PNC 100 reverts. The contents of the switching tables of the PNC 100 and the DEV-A (#1) 112 are reset to normal and transmission and reception of a LAN packet using the original route are performed.

For a method for recognizing, in a wireless layer, occurrence of failure in a wireless portion and alerting notified failure, first, whether a connection request by each DEV is static or ad hoc is managed using a connection table. When a situation different from a normal one occurs, the PNC or a DEV provides a notification. The notification is performed by an email, sound, phone call, or the like. Information that a notification is being provided is entered in and managed by the connection table.

A PNC of the present invention operates as a PC based dedicated device, for example, by SW which operates thereon. A DEV-A of the present invention is installed in a room, for example, so as to be seen from a plurality of DEVs-B and the PNC (in a wirelessly communicable manner). A DEV-A is provided as a box-type device having an Eth/millimeter-wave interface, for example. Such a device can incorporate embedded software (SW) for implementing a method of the present invention. The device is operated based on some kind of embedded OS and functions as a driver for operating hardware (HW) of the Eth/millimeter-wave interface included in the device.

When a DEV-B of the present invention is a terminal personal computer (PC), for example, the DEV-B is operated by software which is supplied with a millimeter-wave wireless LAN card. Alternatively, when the DEV-B is an external device (when the DEV-B is a LAN-compatible security device or household electrical appliance which cannot expand a card as in a PC), the DEV-B is operated by embedded SW which operates in a box-type device, as with the DEV-A.

The present invention has been described with reference to the drawings. However, the present invention is not limited to the above-described embodiment. It will be obvious to those skilled in the art that modifications may be made to the embodiment without departing from the spirit and scope of the present invention.

The invention claimed is:

1. A wireless communication method for performing wireless communication between a master and a plurality of slaves which are included in a wireless local area network (LAN) system, the master performing the steps of:

establishing a respective direct wireless connection between said master and each of said plurality of slaves wherein communications between said master and each respective slave of said plurality of slaves are transmitted via respective direct wireless transmission between said master and the respective slave without re-transmission through another device;

periodically transmitting a master synchronization signal directly from said master to said plurality of slaves, said master synchronization signal being transmitted via respective direct wireless transmission from said master to each slave of said plurality of slaves without re-transmission through another device, said master synchronization signal requiring a respective master synchronization response signal from each of said plurality of slaves;

wherein said plurality of slaves includes at least one slave of a first type and at least one slave of a second type, each said slave of a first type being capable of forwarding a received packet to another slave, and each said slave of a second type being incapable of forwarding a receiving packet to another slave;

responsive to periodically transmitting a master synchronization signal, periodically receiving a respective master synchronization response signal from each of said plurality of slaves having received the master synchronization signal, each respective master synchronization response signal being received via direct wireless transmission from the respective slave to said master without re-transmission through another device;

detecting that no corresponding master synchronization response signal has been received from a first slave of said plurality of slaves responsive to an instance of periodically transmitting said master synchronization signal;

responsive to detecting that no corresponding master synchronization response signal has been received from a first slave of said plurality of slaves responsive to an instance of periodically transmitting said master synchronization signal, transmitting an instruction signal from said master to a specific slave among the at least one slave of the first type of said plurality of slaves to urge the specific slave to send a slave synchronization signal, said specific slave being other than said first slave;

responsive to transmitting an instruction signal from said master to the specific slave, receiving from the specific slave an acknowledgment signal indicating that the first slave has received the slave synchronization signal;

thereafter receiving in said master an information packet addressed to said first slave; and responsive to receiving the information packet, transmitting to the specific slave the information packet for forwarding to the first slave.

2. The wireless communication method of claim 1, wherein wireless communications among said master and said plurality of slaves area according to an IEEE 802.15.3 PICONET protocol.

3. The wireless communication method of claim 1, further comprising resuming transmitting information packets directly from said master to said first slave responsive to receiving an indication from the first slave, responsive to an instance of said master synchronization signal, that the first slave is again capable of receiving signals directly from the master.

4. The wireless communication method of claim 1, wherein the master has a first table and the first table includes a list of communicable slaves.

5. The wireless communication method of claim 4, wherein the specific slave has a second table and the second table includes a list of communicable slaves to which the specific slave is capable of forwarding communications received from the master.

6. The wireless communication method of claim 1, wherein the first slave is unable to respond to the master synchronization signal due to the presence of an obstacle between the master and the first slave.

* * * * *